Dec. 8, 1936.   J. W. FITZ GERALD   2,063,088
COINCIDENTAL LOCK
Filed Dec. 8, 1934   5 Sheets—Sheet 1
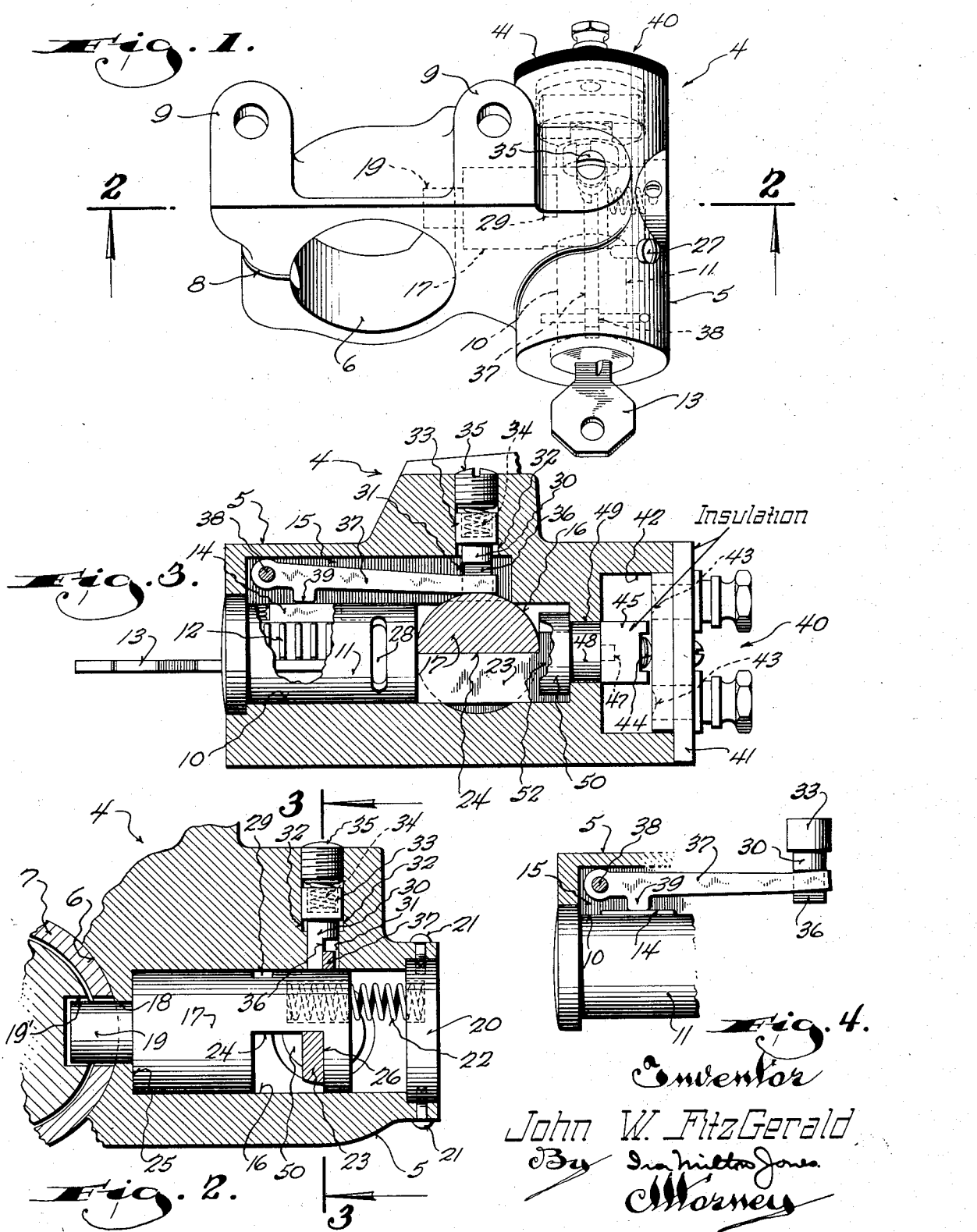
Inventor
John W. FitzGerald
By Ira Milton Jones
Attorney Dec. 8, 1936. J. W. FITZ GERALD 2,063,088
COINCIDENTAL LOCK
Filed Dec. 8, 1934 5 Sheets-Sheet 2
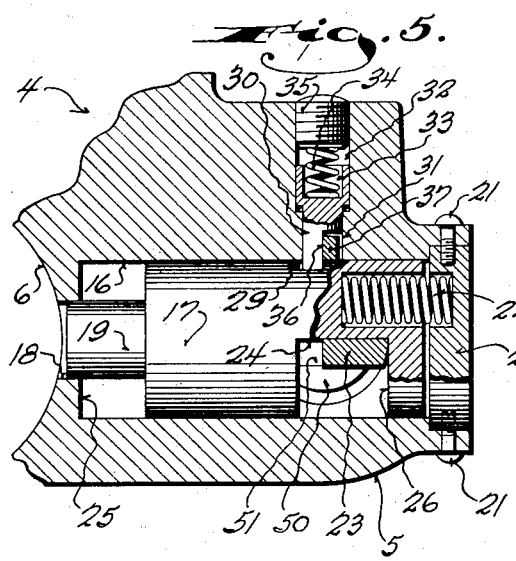
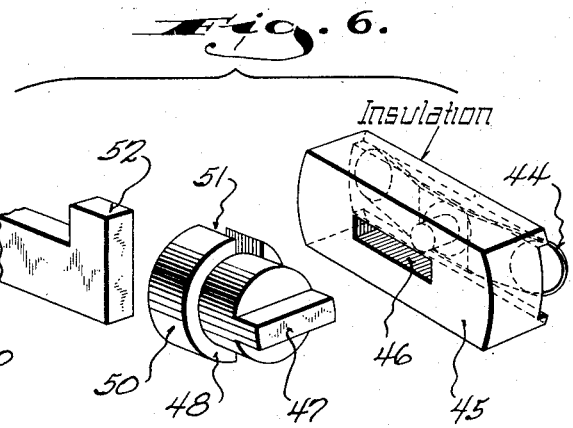
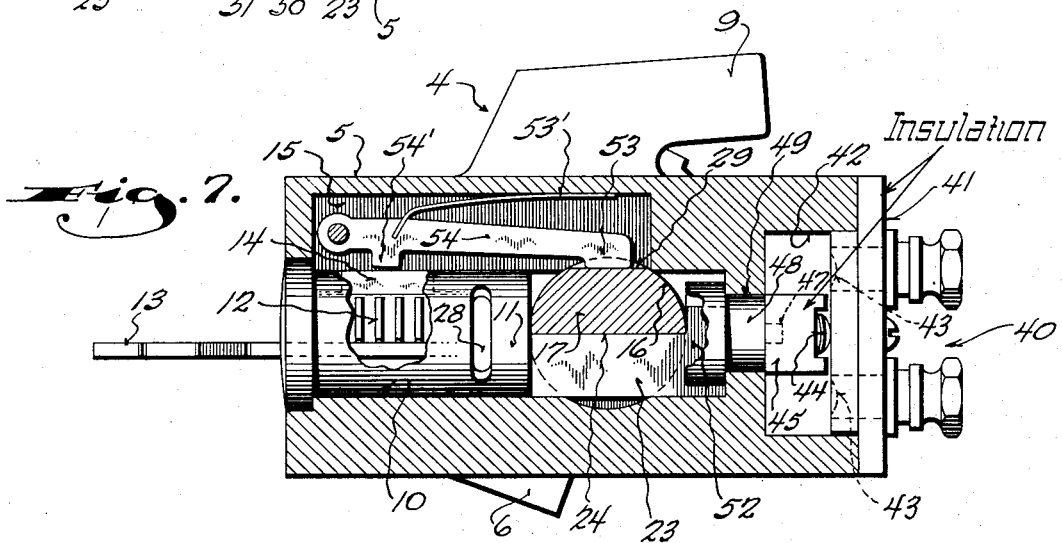
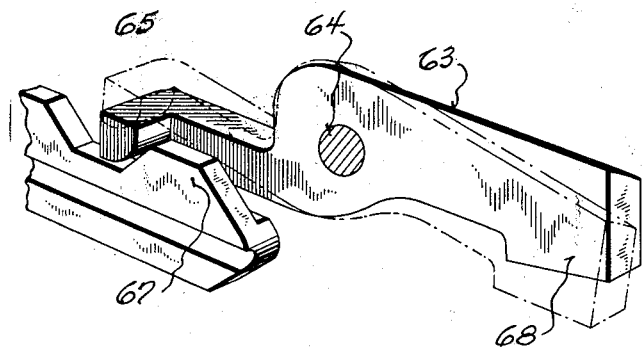
Inventor
John W. FitzGerald
By
Attorney Dec. 8, 1936.    J. W. FITZ GERALD    2,063,088
COINCIDENTAL LOCK
Filed Dec. 8, 1934    5 Sheets-Sheet 3
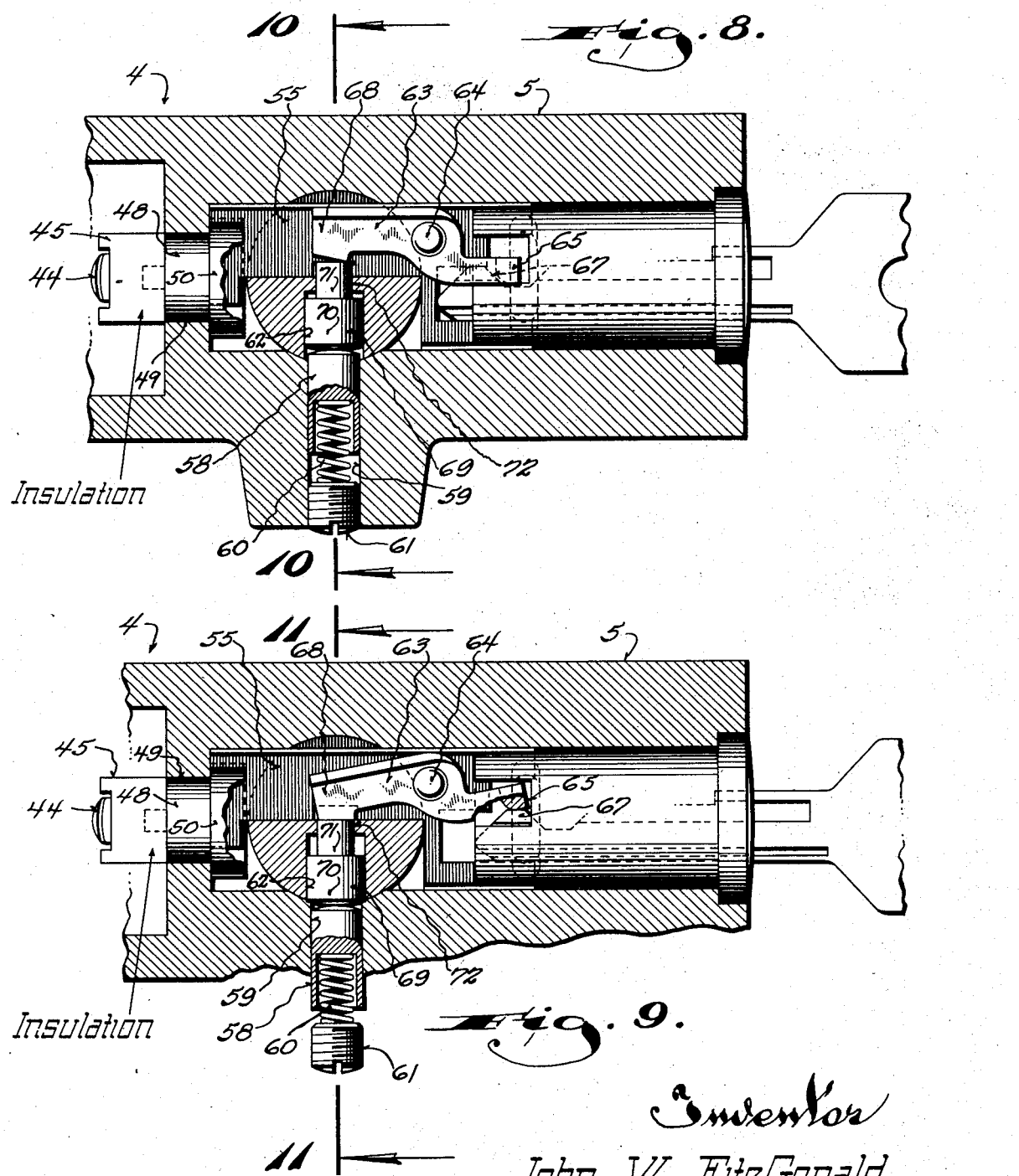
Inventor
John W. FitzGerald
By Iwhitto Jones
Attorney

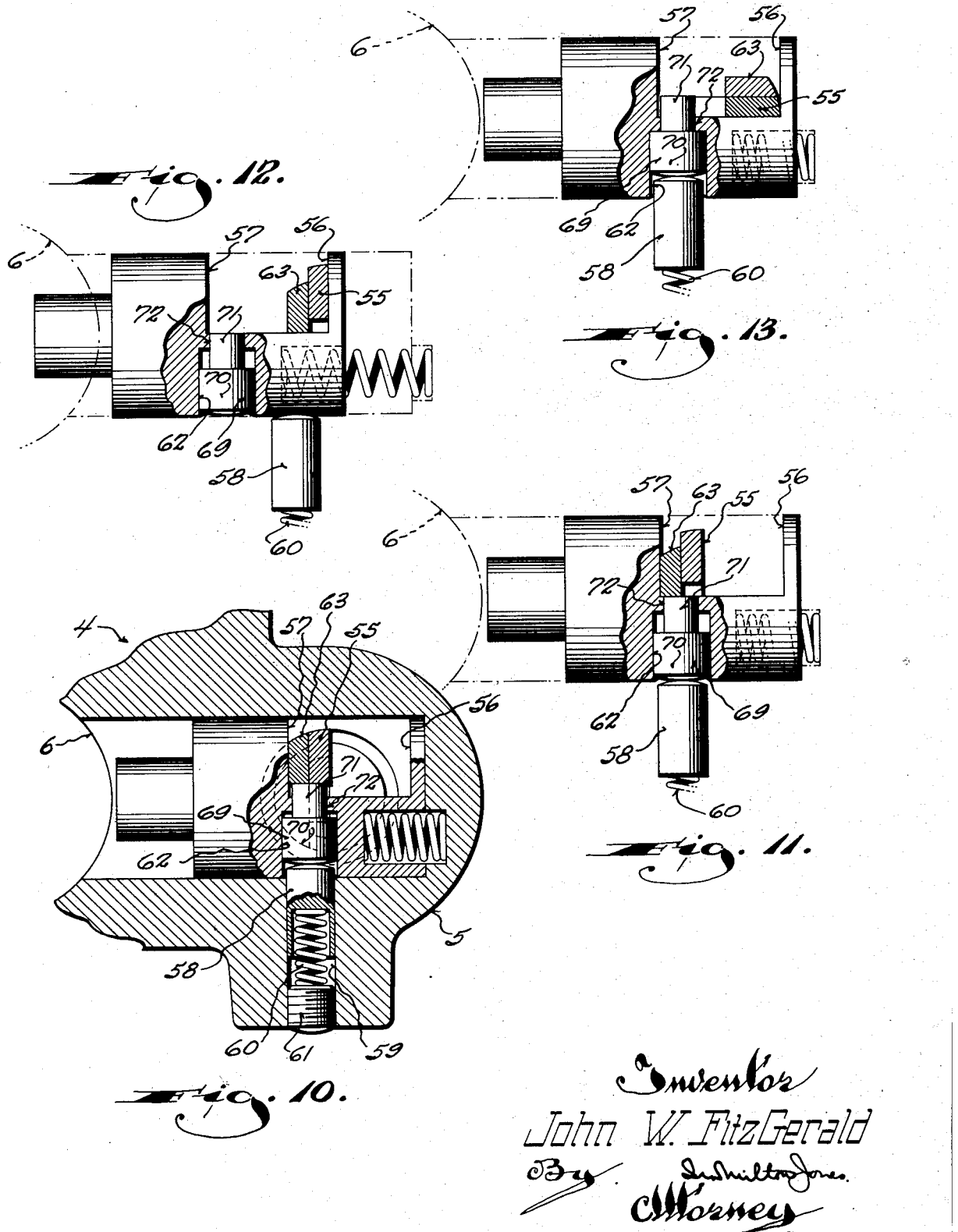

Dec. 8, 1936.  J. W. FITZ GERALD  2,063,088
COINCIDENTAL LOCK
Filed Dec. 8, 1934  5 Sheets—Sheet 5

Inventor
John W. FitzGerald
By [signature]
Attorney

Patented Dec. 8, 1936

2,063,088

UNITED STATES PATENT OFFICE 2,063,088

COINCIDENTAL LOCK

John W. Fitz Gerald, Milwaukee, Wis., assignor to Briggs & Stratton Corporation, Milwaukee, Wis., a corporation of Delaware Application December 8, 1934, Serial No. 756,630

15 Claims. (Cl. 70—127)

This invention relates to improvements in automobile locks and refers more particularly to combined steering post and ignition locks generally referred to as coincidental locks.

In the earliest type of coincidental locks, the steering column was locked and unlocked simultaneously with the opening and closing of the ignition switch effected through the actuation of a key controlled lock. This type of lock was very dangerous not only to the operator of the automobile but to the public as well because of the possibility of locking the steering gear while the car was in motion by accidentally or purposely turning off the ignition before the automobile was brought to a stop.

As a consequence, this earlier type of coincidental lock was soon supplanted by a quasi coincidental form of lock wherein the control of the ignition switch while capable of being locked by the lock provided for securing the steering column against actuation, was nevertheless operable independently of the steering column lock, providing that the lock had been actuated to its released position.

This latter type of combined steering column and ignition lock required two controlling elements, and had the objection of depending upon the fallible human element in necessitating first the actuation of the ignition control and then the operation of the key to effect the locking. As a consequence, the operator seldom used the key controlled lock and merely left the same in its unlocked condition where the ignition switch could be actuated at will. The purpose of the lock was thus defeated.

With these objections to past and existing combined steering post and ignition locks in mind, it is an object of this invention to provide a lock which is truly coincidental and one in which the locking of the steering column does not take place upon merely the turning of the key to open the ignition switch, but requires in addition actual withdrawal of the key from the lock.

More specifically it is an object of this invention to provide a lock of the character described wherein the locking bolt is retractible to an unlocked position simultaneously with the closing of the ignition switch by the rotation of a lock cylinder and wherein the locking bolt is held in its retracted position as long as the key remains properly within the lock cylinder so that the ignition switch may be turned on and off without causing the bolt to lock the steering column.

It is also an object of this invention to provide novel means dependent upon the presence of a key in the lock cylinder for releasably holding the locking bolt in a retracted unlocked position which means is released to allow projection of the bolt to its locked position upon withdrawal of the key from the lock.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claim.

The accompanying drawings illustrate several complete examples of the physical embodiment of the invention constructed according to the best modes so far devised for the practical application of the principles thereof, and in which:

Figure 1 is a top view of a coincidental lock structure embodying this invention;

Figure 2 is a section view taken through Figure 1 on the plane of the line 2—2;

Figure 3 is a section view taken through Figure 2 on the plane of the line 3—3;

Figure 4 is a fragmentary detail view illustrating part of the mechanism shown in Figure 3, but in another position;

Figure 5 is a section view similar to Figure 2, but showing the locking bolt retracted;

Figure 6 is a perspective view of the ignition switch contactor carrier and the lock cylinder driven means for actuating the same;

Figure 7 is a view similar to Figure 3 illustrating a modified embodiment of the invention;

Figure 8 is a section view similar to Figure 3 showing another modified embodiment of the invention with the locking bolt secured in its unlocked position;

Figure 9 is a view similar to Figure 8 showing the manner in which the locking bolt thereof is released for movement to its locked position;

Figure 10 is a detail section view taken through Figure 8 on the plane of the line 10—10;

Figure 11 is a detail view showing only the bolt and its associated mechanism with parts broken away and in section, said view being taken substantially on the plane of the line 11—11 of Figure 9;

Figures 12 and 13 are views similar to Figure 11, but showing the parts in different positions;

Figure 14 is a perspective view of the key operable means for releasing the bolt holding means and the adjacent end of the key;

Figure 15:
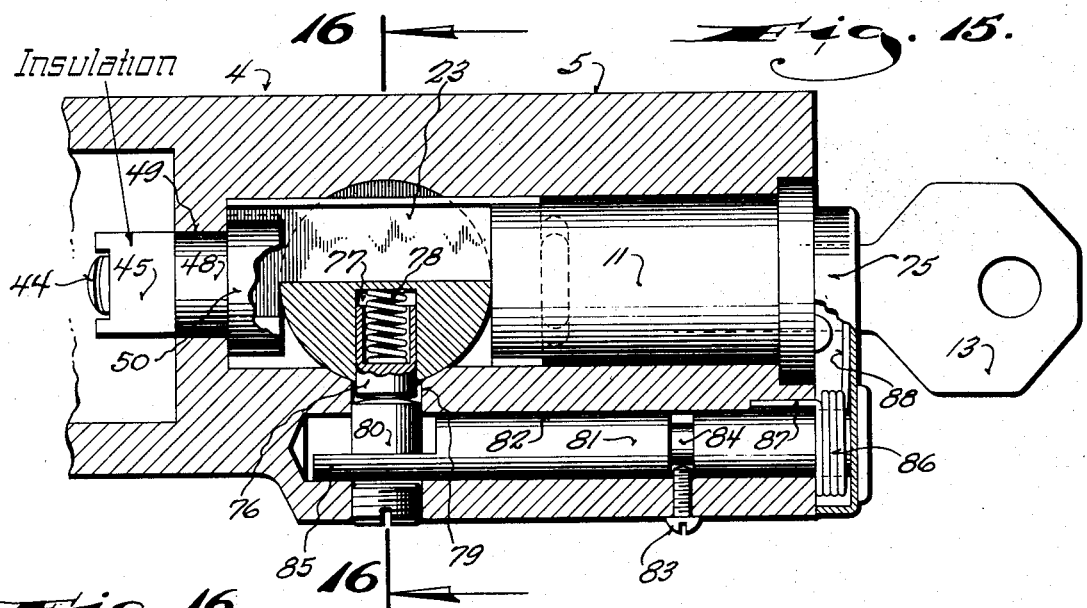
Figure 15 is a section view through a lock showing another modified embodiment of the invention.

Referring now more particularly to the accompanying drawings in which like numerals indicate like parts throughout the several views, the numeral 4 designates generally the body of the lock structure which has a substantially barrel-like portion 5 forming a housing or enclosure for the lock mechanism and a ring 6 adapted to embrace the steering column 7.

The ring 6 is split as at 8 and provided with a screw to draw the same tightly about the steering column, and attaching ears 9 are provided by which the body may be secured to part of the dashboard so as to provide a firm support for the steering column.

The barrel-like portion 5 has a bore 10 to receive a lock cylinder 11 provided with tumblers 12 operable by a conventional key 13. The tumblers 12 are arranged to project a locking bar 14 outwardly of the cylinder and into a locking groove 15 communicating with the bore 10.

In the absence of a key 13, the tumblers 12 project the locking bar outwardly into the groove 15 to secure the cylinder against rotation, and as is customary, upon insertion of the key 13 into the cylinder, the tumblers 12 are retracted to a position at which the locking bar is permitted to move to an inoperative position freeing the cylinder for rotation.

Intersecting the bore 10 is a bore 16 in which a locking bolt 17 is slidably mounted. The bore 16 terminates short of the inside of the ring 6 but is communicated therewith through a bore 18 of reduced diameter through which a reduced end portion 19 of the bolt projects for engagement with a keeper recess 19' in the rotatable inner element of the steering column.

The opposite end of the bore 16 is closed by a plate 20 removably secured in position by screws 21, and confined between the plate 20 and the adjacent end of the bolt is an expansive spring 22 to yieldingly urge the bolt to its operative locked position.

As shown, the lock cylinder 11 terminates short of the cross bore 16 in which the bolt is slidably disposed, and projecting from the inner end of the cylinder is a driving cam 23 in the form of a flat bar having one longitudinal corner thereof substantially coinciding with the axis of the cylinder so that the adjacent wide and narrow sides of the bar lie in right angularly disposed planes radial to the axis of the cylinder.

The medial portion of the cam 23 is received in a recess 24 formed in the bolt 17. The recess 24 is of a depth substantially equal to half the diameter of the bolt so that the bottom thereof lies in a plane in which the axes of the cylinder and the bolt lie so that either the narrow or the wide side of the cam adjacent its corner which coincides with the axis of the cylinder, depending upon the position of rotation of the cylinder, is in substantially flat engagement with the bottom of the recess 24 to hold the bolt against turning.

When the bolt is in its locked position to which it is yieldingly urged by the spring 22 and which is defined by the inner end of the bolt engaging the shoulder 25 between the bore 16 and the reduced bore 18, the relative positions of the recess 24 and the driving cam 23 are such that the wide face of the cam engages the outer end 26 of the recess. Consequently, upon rotation of the cylinder in a counter-clockwise direction (as viewed in Figure 2) which is the only direction the cylinder is permitted to turn by reason of the stop lug 27 engaging in an arcuate groove 28 in the cylinder, the cam 23 acting against the end wall 26 of the recess 24 retracts the bolt against the action of the spring 22 a distance sufficient to withdraw its end 19 from the keeper 19' in the steering column.

Upon complete retraction of the locking bolt effected by rotation of the cylinder through ninety degrees, a notch 29 in the bolt is brought in register with a bolt holding member in the form of a pin 30 slidably received in a bore 31 in the lock body opening into the bore 16.

The bore 31 is counterbored as at 32 to provide a shoulder against which the outer enlarged end 33 of the pin 30 abuts to limit the inward movement of the pin effected by a compression spring 34 confined between the pin and a threaded plug 35 closing the outer end of the counterbore.

The inner end of the pin 30 is slabbed off to provide a flat face 36 which engages the flat face of the notch 29 to hold the bolt in its retracted position upon alignment of the notch 29 with the end of the pin 30.

Besides opening to the bore 16, the bore 31 in which the holding pin operates is in line with the longitudinal groove 15 in the lock body which receives the locking bar 14 to secure the cylinder against rotation and which is deepened to accommodate a releasing lever 37.

The lever 37 is pivotally mounted as at 38 in the outer end of the groove 15 and its free end portion projects into the bore 31 for planar engagement with the flat surface 36 of the pin. The lever normally is in an inactive position defined by resting on the cylindrical surface of the bolt, and inasmuch as the slabbed off or cut out portion of the holding pin is longer than the width of the free end portion of the lever, it will be readily apparent that the presence of the lever 37 does not prevent the engagement of the holding pin 30 in the notch 29 upon retraction of the bolt.

Directly opposite the locking bar 14, the lever 37 has a foot 39, which, when the locking bar is retracted within the periphery of the cylinder by the insertion of the key 13, clears the diameter of the cylinder so as not to interfere with free rotation of the cylinder, but when the cylinder is turned to its locked position of rotation, which is the only position at which the key can be withdrawn, and the key is withdrawn so that the locking bar 14 projects to its operative position, the locking bar by engaging the foot 39 lifts the releasing lever as illustrated in Figure 4 to move the holding pin 30 out of engagement with the notch 29 and thus release the bolt for projection to its locked position. Hence, as long as the key 13 remains properly inserted in the cylinder and after the cylinder has been turned to retract the bolt to its unlocked position, subsequent rotation of the cylinder does not in anywise affect the locking bolt.

In other words, after the bolt has been moved to its unlocked position and as long as the key remains in the cylinder, the cylinder may be turned through its limits of rotation without causing the projection of the locking bolt to its locked position.

Inasmuch as the rotation of the cylinder also opens and closes an ignition switch indicated generally by the numeral 40, as now about to be described, it will be appreciated that provision is thus made for opening and closing of the ignition switch independently of the actuation of the locking bolt, after the locking bolt has been retracted to unlocked position.

The ignition switch comprises an insulating terminal head 41 in the form of a disk conveniently secured in a counterbore 42 coaxial with the cylinder 13 but at the opposite end of the lock body.

Stationary terminals 43 are secured to the terminal head to be electrically bridged by a contactor 44. The contactor 44 is fixed to an insulated carrier 45 provided with a recess 46 into which the flattened end portion 47 of a driver 48 fits.

From Figure 3, it is to be observed that the depth of the counterbore 42 is such that the space between the bottom thereof and the inner face of the terminal head is just sufficient to accommodate the carrier 45 and maintain the contactor 44 in compression.

The driver 48 is journalled in a reduced bore 49 communicating the counterbore 42 with the bore 10 in which the cylinder is disposed, and has an enlarged head 50 slotted as at 51 to receive the adjacent inner end 52 of the cylinder carried driving cam 23.

In this manner a non-rotatable connection is established between the cylinder carried cam and the contactor of the ignition switch, while at the same time removal of the cylinder and the cam is accommodated, and inasmuch as the driving connection between the cylinder and the contactor of the ignition switch is direct, it will be readily apparent that rotation of the cylinder opens and closes the switch directly.

In the embodiment of the invention thus far described, the locking bolt is automatically held in its unlocked position by the engagement of a holding pin in a notch in the bolt. A simple modification of this construction, whereby the pin may be eliminated is illustrated in Figure 7.

As here shown, the free end portion 53 of a lever 54 similar to the lever 37 and similarly pivotally mounted in the groove 15, directly engages the notch in the locking bolt. A flat leaf spring 53' may be provided to yieldingly urge the lever toward the bolt to snap its free end 53 into the notch in the bolt upon alignment therewith. As in the embodiment hereinbefore described, disengagement of the holding means from the bolt to release the bolt for projection to locked position is effected by outward projection of the locking bar 14 through engagement of the bar 14 with a foot 54' on the lever 54.

From the description thus far, it is evident that the salient features of this invention reside in the provision of means whereby the locking bolt is retractible to an unlocked position simultaneously with the closing of the ignition switch, and whereby subsequent opening and closing of the ignition switch may be effected without disturbing the locking bolt as long as the key remains properly within the lock cylinder.

Obviously, these features are susceptible to embodiment in different modifications of construction, and in Figures 8 to 14, inclusive, the objects of the invention are attained through a construction wherein a cam on the key acts during withdrawal of the key to release the locking bolt for projection to its locked position.

This embodiment of the invention in many respects is similar to that already described. The ignition switch contactor is driven in the same manner, that is, by a cam 55 carried by and projecting rearwardly from the cylinder. The retraction of the locking bolt to unlocked position is likewise effected in a similar manner, through the action of the cam 55 on one end wall 56 of a notch 57 in the locking bolt.

However, the specific manner in which the bolt is held in its unlocked position and the holding means therefor is released is different. As clearly shown in the series of comparative views of Figures 10 to 13, inclusive, the locking bolt is releasably held in its unlocked position by a locking pin 58 slidable in a bore 59 in the body of the lock and yieldably projected toward the bolt by a spring 60 confined between the pin and a threaded plug 61 closing the outer end of the bore 59.

When the bolt is retracted to its unlocked position through the action of the driving cam 55, as shown in Figure 13, the pin 58 is snapped into a hole 62 in the bolt. When the bolt is thus secured against projection to locked position by its spring, the cylinder and the driving cam 55 therewith may be freely turned through its permitted ninety degrees of rotation to effect opening and closing of the ignition switch without in anywise disturbing the position of the bolt.

Disengagement of the pin 58 from the bolt so as to release the bolt for projection to locked position is effected by tilting a lever 63 medially pivoted to the driving cam 55, as at 64, and overlying one face thereof. One end of the lever 63 has a laterally directed lug 65 which lies in the path of a raised projection 67 on the inner end of the key. The projection is of sufficient height to cause the desired tilting movement of the lever 63 as the key is withdrawn from the cylinder.

The opposite end 68 of the lever is arranged to push down on a drive pin 69 having an enlarged end 70 slidable in the hole 62 and a reduced portion 71 projecting through a smaller bore 72 connecting the hole 62 with the recess 57. Hence, upon withdrawal of the key as shown in Figure 9, the holding pin 58 is pushed out of the hole 62 to free the locking bolt for projection by its spring to locked position.

Another manner of releasing the locking bolt upon withdrawal of the key from the cylinder is embodied in the modification illustrated in Figures 15 to 18, inclusive. In this embodiment of the invention, the release of the locking bolt is controlled by the movement of a dust cover 75. In this instance, the locking bolt is releasably secured in its retracted unlocked position by a pin 76 slidably mounted in a radial bore 77 in the bolt and yieldingly projected by a spring 78 into a bore 79 upon alignment of the pin 76 therewith.

The bore 79 also contains a pusher pin 80 adapted to push the locking pin 76 out of the bore 79. To actuate the pusher pin 80, the dust cover 75 is provided with a shaft 81 rigidly fixed thereto and freely rotatably mounted in a bore 82 intersecting the bore 79. A screw 83 having its inner end projecting into an annular groove 84 in the shaft 81 holds the same against endwise movement with the dust cover properly positioned to swing to and from a position covering the outer end of the cylinder.

At its inner end the shaft 81 has an eccentric cam 85 which projects through the intersection of the bores 82 and 79 to engage the pusher pin 80. The location of the eccentric cam 85 with respect to the dust cover 75 is such that when the cover is in its normal position over the lock cylinder, the cam 85 will be in its position illustrated in Figure 17.

A torsion spring 86 coiled about the stem 81 within the cover 75 with one end 87 arranged to enter a hole (not shown) formed in the body of the lock and its other end 88 bearing against a side wall of the dust cover yieldingly maintains the dust cover in its operative closed position defined by the engagement of a side wall of the cover with the end 87 of the spring.

Figure 16:
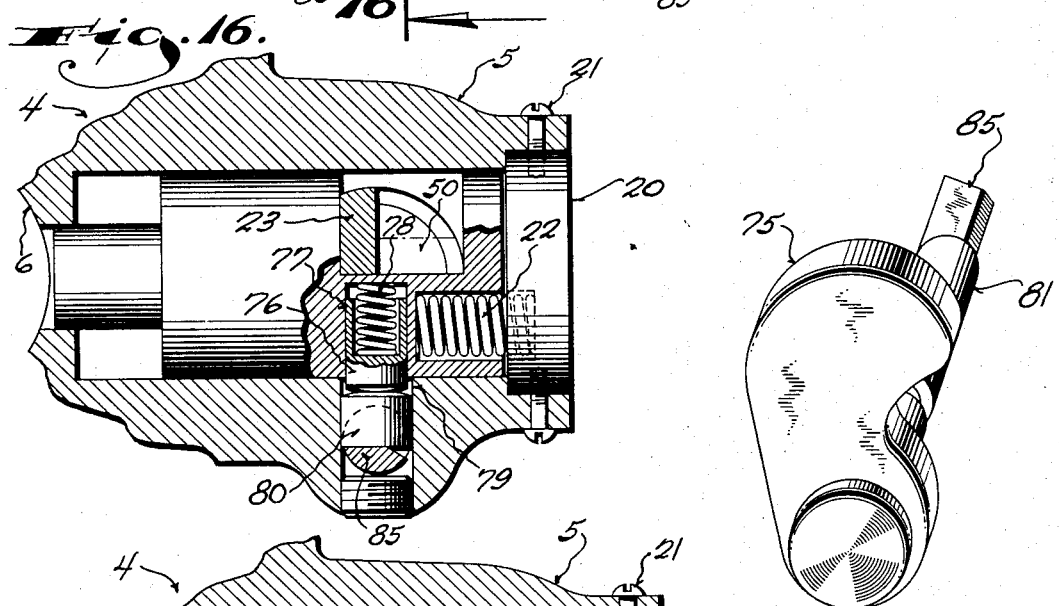
Figure 16 is a cross section view through Figure 15 on the plane of the line 16—16 with the bolt held in its retracted unlocked position.
Figure 18:
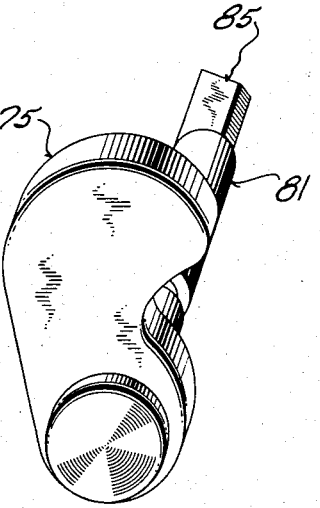
Figure 18 is a detailed perspective view of the dust cover which controls the release of the locking bolt in the modification shown in Figures 15, 16 and 17.
Figure 17:
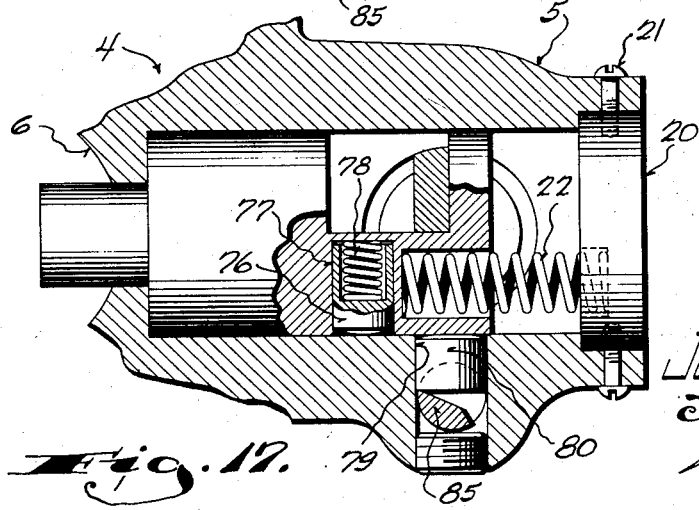
Figure 17 is a view similar to Figure 16, but showing the bolt projected to locked position.

Upon swinging movement of the cover to its position allowing insertion of the key into the cylinder, the cam 85 is turned to its position shown in Figures 15 and 16 at which the pusher pin is allowed to drop to a location permitting the projection of the holding pin 76 into the bore 79. Consequently, when the key is inserted the parts are placed in their positions allowing the bolt holding means to become active to secure the bolt in its retracted unlocked position upon alignment of the holding pin 76 with the bore 79.

This condition of the parts obtains as long as the key is left in the cylinder, but upon withdrawal of the key from the cylinder and the return of the dust cover to its normal position by the spring 86, the pusher pin 80 through the action of the cam 85 will be actuated to push the holding pin 76 out of the bore 79 thus freeing the locking bolt for projection to locked position.

From the foregoing description taken in connection with the accompanying drawings, it will be readily apparent to those skilled in the art to which this invention appertains, that this invention provides a coincidental lock for locking the steering column and simultaneously actuating the ignition switch which is truly coincidental and in which the desired coincidental performance of the two functions is obtained without the dangerous possibility of locking the steering gear merely by opening the ignition switch.

What I claim as my invention is:

1. In a coincidental lock, a locking member movable between locked and unlocked positions, an ignition switch, a rotatable lock cylinder adapted to receive a key, a connection between the lock cylinder and the locking member and between the lock cylinder and the ignition switch whereby rotation of the cylinder is capable of actuating both the locking member and the ignition switch, the connection between the lock cylinder and the locking member allowing rotation of the cylinder to its position opening the ignition switch without affecting the position of the locking member when in its unlocked position but being such that when in its locked position opposite rotation of the cylinder moves the locking member to unlocked position and simultaneously closes the ignition switch, and releasable means for holding the locking member in its unlocked position independently of the lock cylinder.

2. In a coincidental lock, a locking member movable between locked and unlocked positions, an ignition switch, actuating means for simultaneously moving the locking member to unlocked position and for closing the ignition switch including a lock cylinder adapted to receive a key, and means automatically operable and controlled entirely by movement of the locking member and so associated therewith that movement of the locking member to an unlocked position results in said means becoming operative for holding the locking member in unlocked position independently of said actuating means whereby said actuating means is operable to open the ignition circuit without affecting movement of the locking member to locked position, said holding means being releasable upon withdrawal of the key from the lock cylinder.

3. In a coincidental lock, a locking member movable between locked and unlocked positions, an ignition switch, a rotatable lock cylinder adapted to receive a key, a connection between the lock cylinder and the locking member and between the lock cylinder and the ignition switch whereby rotation of the cylinder is capable of actuating both the locking member and the ignition switch, the connection between the lock cylinder and the locking member allowing rotation of the cylinder to its position opening the ignition switch without affecting the position of the locking member when in its unlocked position but being such that when in its locked position opposite rotation of the cylinder moves the locking member to unlocked position and simultaneously closes the ignition switch, releasable means for holding the locking member in its unlocked position independently of the lock cylinder, spring means for snapping the holding means into operative holding engagement with the locking member the instant said locking member reaches its unlocked position, and key controlled means operable in opposition to said spring means upon withdrawal of the key from the cylinder for releasing said holding means.

4. In a coincidental lock, a locking member biased to locked position, an ignition switch, a rotatable lock cylinder adapted to receive a key and freed for rotation upon insertion of the key, a connection between the lock cylinder and the locking member whereby rotation of the cylinder in one direction moves the locking member to an unlocked position, said connection allowing reverse rotation of the cylinder without affecting the locking member when in its unlocked position, so that rotation of the cylinder while the locking member is in its unlocked position has no effect on the locking member, a connection between the cylinder and the ignition switch whereby the ignition switch is directly operable to and from closed position by rotation of the cylinder, releasable holding means for holding the locking member in its unlocked position, and means for releasing said holding means to free the locking member for movement to locked position.

5. In a coincidental lock, a locking member biased to locked position, an ignition switch, a rotatable lock cylinder adapted to receive a key and freed for rotation upon insertion of the key, a connection between the lock cylinder and the locking member whereby rotation of the cylinder in one direction moves the locking member to an unlocked position, said connection allowing reverse rotation of the cylinder without affecting the locking member when in its unlocked position, so that rotation of the cylinder while the locking member is in its unlocked position has no effect on the locking member, a connection between the cylinder and the ignition switch whereby the ignition switch is directly operable to and from closed position by rotation of the cylinder, releasable holding means for holding the locking member in its unlocked position, and spring pressed means tending at all times to release said holding means to free the locking member for movement to locked position, said spring pressed means being held inactive by the key in the lock cylinder regardless of the position of rotation of the lock cylinder and being rendered active upon withdrawal of the key from the cylinder.

6. In a coincidental lock, a locking member biased to locked position, an ignition switch, key controlled means for simultaneously moving the locking member to an unlocked position and for closing the ignition switch, holding means biased to operative position and held inoperative by the locking member and automatically operable upon movement of the locking member to an unlocked position to secure the locking member in said unlocked position so that the key controlled means may be actuated to open and close the ignition switch without affecting the position of the locking member, and means for releasing the holding means to free the locking member for movement to its locked position.

7. In a coincidental lock, a locking member movable to and from locked position, an ignition switch, a key controlled lock cylinder rotatable to simultaneously move the locking member to an unlocked position and close the ignition switch, means for holding the locking member in an unlocked position, and means for disabling the holding means to free the locking member for movement to locked position, said disabling means being inoperative and remaining so as long as a key is in the lock cylinder regardless of its position of rotation and becoming operative solely upon withdrawal of the key from the lock cylinder.

8. In a lock, a locking member movable to and from a locked position, a rotatable lock cylinder adapted to receive a key by which the cylinder is freed for rotation, a driving connection between the cylinder and locking member whereby rotation of the cylinder moves the locking member to an unlocked position, releasable means for holding the locking member in its unlocked position, spring means biasing the holding means to operative position so that it becomes operative the instant the locking member reaches its unlocked position, and means operable in opposition to said spring means upon withdrawal of the key from the cylinder for actuating the releasing means to free the locking member for movement to locked position.

9. In a lock, a lock body having intersecting bores, a locking bolt slidable in one of said bores and yieldingly urged to a locked position, a lock cylinder in the other bore adapted to receive a key by which the cylinder is freed for rotation, a driving connection between the cylinder and the locking bolt whereby rotation of the cylinder retracts the locking bolt to an unlocked position, releasable means for holding the locking bolt in an unlocked position, spring means biasing the holding means to operative position so that it becomes operative the instant the locking member reaches its unlocked position, and means operable in opposition to said spring means upon withdrawal of the key from the cylinder for disabling said releasable means to free the locking bolt for movement to its locked position.

10. In a lock, a locking bolt, a lock cylinder adapted to receive a key and freed for rotation upon insertion of the key, a driving connection between the cylinder and the bolt whereby the bolt is movable to an unlocked position by rotation of the cylinder, releasable means for holding the bolt in its unlocked position, and means set in motion by a projection on the key upon withdrawal of the key from the cylinder for disabling said releasable holding means to free the bolt for movement out of unlocked position.

11. A combined steering post and ignition lock comprising a lock body having a part arranged to embrace a steering post and another part provided with intersecting bores, one of which is radial to a steering post with which the lock is associated, a locking bolt in said bore yieldingly urged to project an end portion thereof into a keeper in the steering post, an ignition switch having a movable contactor rotatable about the axis of the other bore, a lock cylinder in said other bore, key operable means carried by the cylinder to project therefrom into engagement with the lock body to hold the cylinder against rotation, said key operable means being retractible to free the cylinder for rotation upon the insertion of a proper key into the cylinder, a driving cam carried by the cylinder having a driving connection with the locking bolt and the movable contactor of the ignition switch so that rotation of the cylinder in one direction simultaneously retracts the locking bolt to an unlocked position and closes the ignition switch, means automatically operable upon retraction of the locking bolt to unlocked position for releasably holding the bolt in such unlocked position, and means operable upon withdrawal of the key from the cylinder for disabling the bolt holding means to free the same for projection to its locked position.

12. In a lock, a locking bolt, a lock cylinder for moving the locking bolt to one position, yieldable means urging the bolt toward another position, means for releasably holding the locking bolt in said first designated position independently of the cylinder, and key controlled means operable upon outward withdrawal of a key from the cylinder for releasing said holding means including a pivoted lever operable by a projection on the key during withdrawal of the key.

13. In a lock, a slidable bolt yieldingly urged toward one position, a rotatable lock cylinder adapted to receive a key and rotatable upon insertion of a proper key therein, a driving cam carried by the cylinder and engageable with the bolt for moving the bolt to another position upon rotation of the cylinder in one direction, means for releasably holding the bolt in said other position independently of the cylinder, and means for disabling said last named means upon withdrawal of the key from the cylinder comprising a lever pivotally mounted on the driving means and having a part lying in the path of a projection on the key during withdrawal of the key from the cylinder.

14. In a lock of the character described, a locking bolt yieldingly urged to one position and movable to another position, a rotatable cylinder for moving the bolt to said other position and for actuating other instrumentalities, said cylinder being adapted to receive a key upon insertion of which the cylinder is freed for rotation, a driving cam carried by the cylinder engageable with the bolt to move the same to its other position and engageable with the other instrumentalities to be actuated, a locking pin for automatically securing the locking bolt in said other position upon movement of the bolt to said other position whereby subsequent rotation of the cylinder actuates only the other instrumentalities and in nowise affects the position of the locking bolt, and means for moving the locking pin to free the bolt for movement to its first designated position comprising a lever pivoted to the driving cam, means acted upon by one end of the lever for moving the pin to its inoperative position, and means on the other end of the lever lying in the path of a projection on the key during withdrawal of the key whereby withdrawal of the key pivots the lever and effects the release of the locking bolt.

15. In a lock, a bolt biased to locked position, a lock cylinder for retracting the bolt to unlocked position, said lock cylinder being rotatable by a proper key inserted into the cylinder to effect retraction of the bolt to unlocked position, a detent to retain the bolt in its unlocked position, and means operable by a projection on a key in the lock cylinder upon withdrawal of the key therefrom for disabling said detent.

JOHN W. FITZ GERALD.